May 26, 1970  W. W. PORTER  3,513,650
DELEAFER

Filed Feb. 16, 1967  5 Sheets-Sheet 1

INVENTOR.
WELLINGTON W. PORTER.
BY
ATTORNEY

May 26, 1970

W. W. PORTER 3,513,650

DELEAFER

Filed Feb. 16, 1967

INVENTOR.
WELLINGTON W. PORTER,

BY

ATTORNEY

May 26, 1970    W. W. PORTER    3,513,650

DELEAFER

Filed Feb. 16, 1967    5 Sheets-Sheet 5

INVENTOR.
WELLINGTON W. PORTER.
BY
ATTORNEY.

United States Patent Office 3,513,650
Patented May 26, 1970

3,513,650
DELEAFER
Wellington W. Porter, R.D. 2, Dublin Road,
Waterloo, N.Y. 13165
Filed Feb. 16, 1967, Ser. No. 616,600
Int. Cl. A01d 55/00
U.S. Cl. 56—234
10 Claims

ABSTRACT OF THE DISCLOSURE

A mobile deleafer for cutting the leaves from brussels sprouts plants close to the sprouts, preliminary to harvest, the cutting apparatus comprising a pair of swinging frames disposed for movement along opposite sides of a row of sprouts, each swinging frame having pairs of contra-rotating vertical axis knives, adapted to be variably spaced from the plant stalks by stalk engaging cams, to avoid injury to the sprouts. Leaf lifting guides assist positioning of the leaves for effective cutting.

---

This invention relates to the harvesting of brussels, sprouts and the like, and more particularly a preliminary operation of deleafing the plants.

In an application Ser. No. 327,462 filed Dec. 2, 1963, now Pat. No. 3,399,520, there is shown a harvester for brussels sprouts wherein provision is made for rapidly cutting the sprouts laden stalks close to the ground, and conveying the stalks thus cut to means for transporting the stalks to the freezer, cannery or other processing location. It is highly desirable, just prior to harvesting the stalks to remove the leaves from each stalk because of their bulk. The leaves when removed may be left on the ground between the rows. Their bulk is such as would unduly encumber the transportation of the cut stalks and unduly waste the space of the transportation facilities, and create a disposal problem at the processing location.

The present invention is directed toward an apparatus for cutting the leaves from the stalks, while the stalks are rooted in the ground, and prior to severing the stalk in the harvest thereof. The invention is directed to cutting the leaves from the stalk as close to the sprouts as possible without danger of injury to the sprouts, and thereby removing substantially all of the leafy portion of the leaf, leaving only short stem sections projecting from the individual plants. The invention further has to do with initially lifting the leaves from the ground so as to cause the leaves to extend laterally away from the plant immediately prior to cutting, whereby all but a short portion of the leaf stems may be cut. The invention further comprises pairs of counterrotating vertical knives which are adapted to engage the leaf stems to cut the leaves therefrom, the apparatus being so constructed as to provide successive cutting stages, and means for automatically spacing the cutters laterally of the plant stalks a proper distance to avoid injury to the individual sprouts of each plant.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

Figure 1:
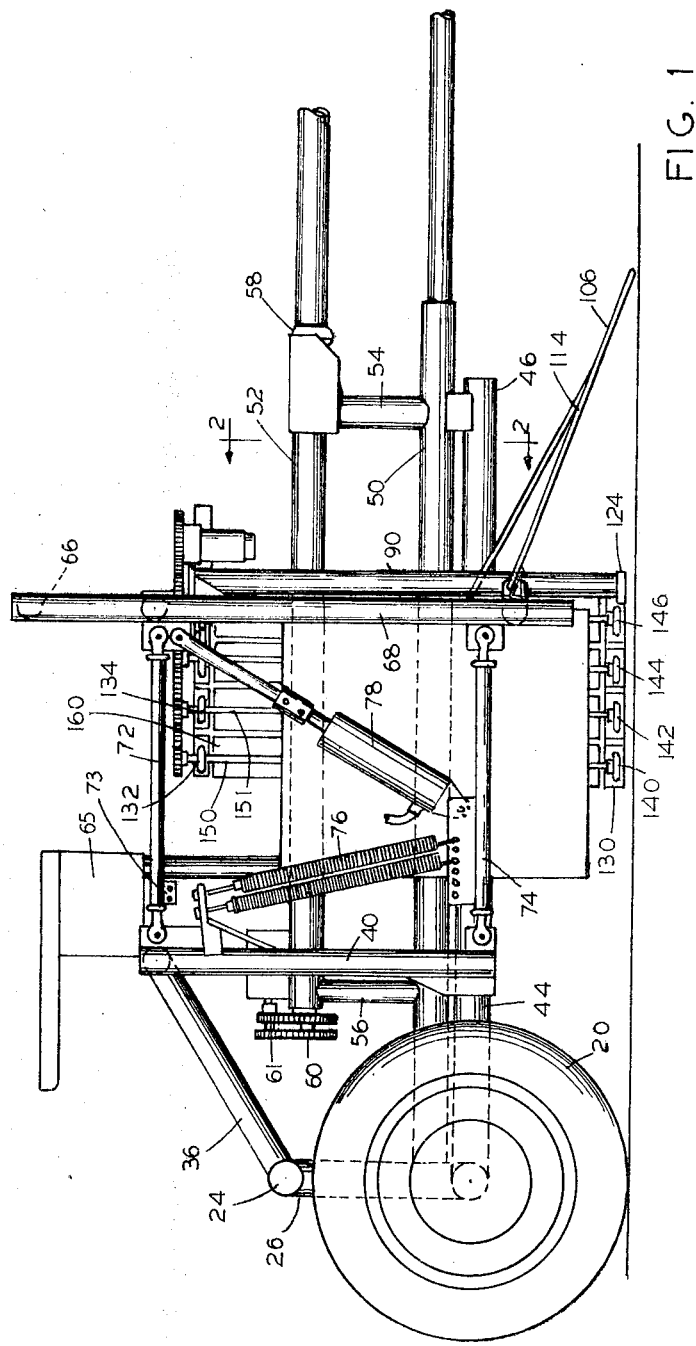
Figure 2:
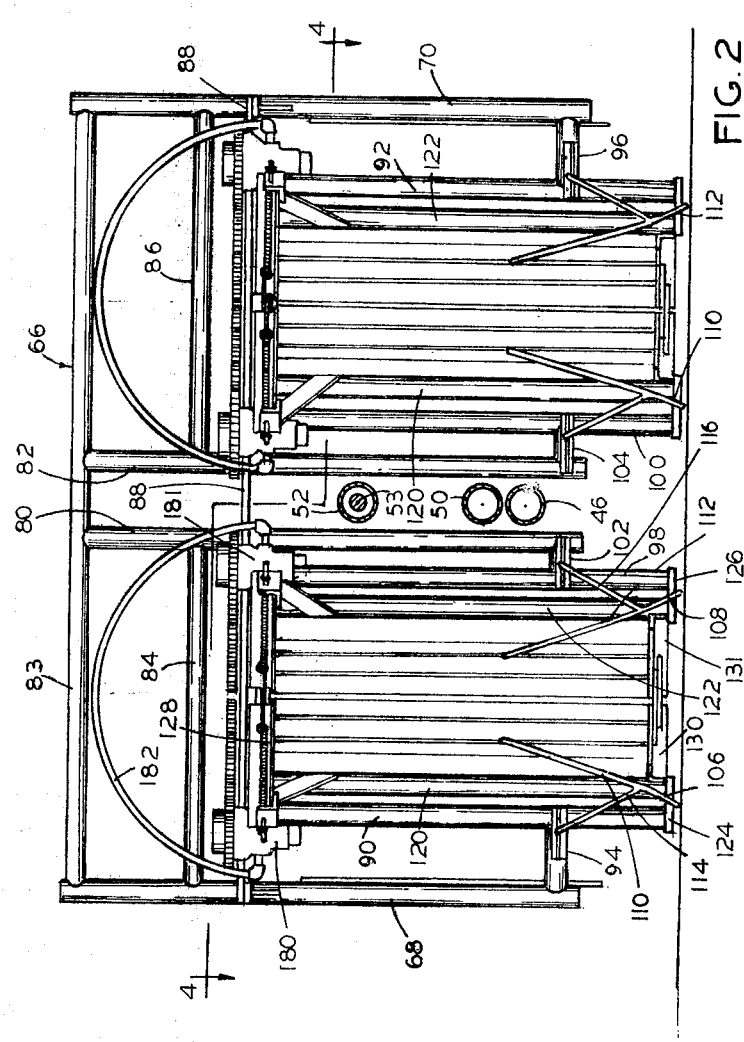
Figure 3:
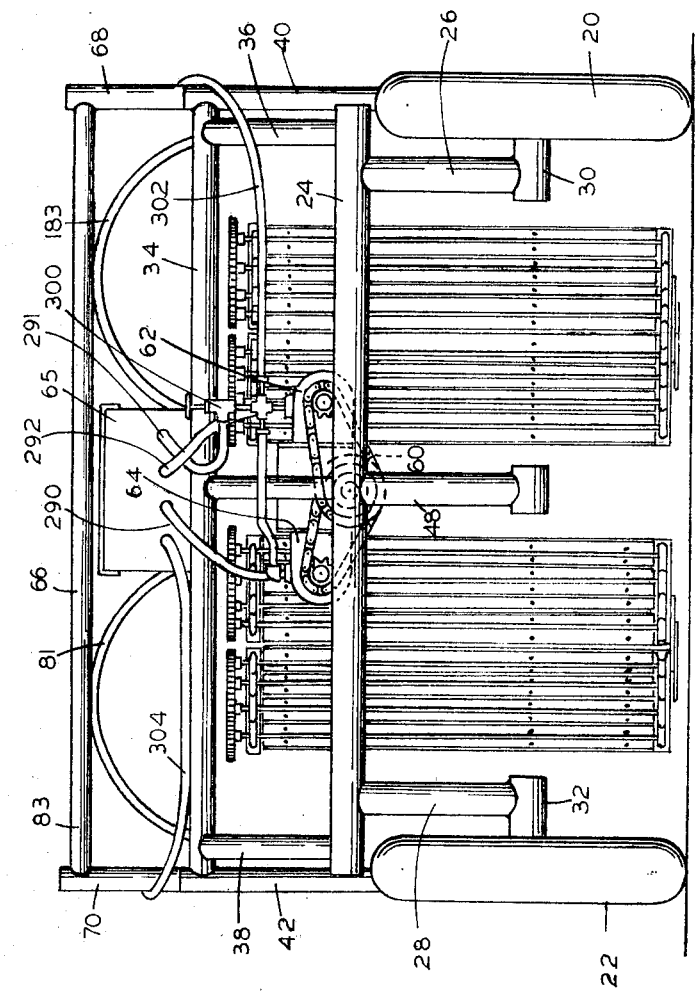
Figure 4:
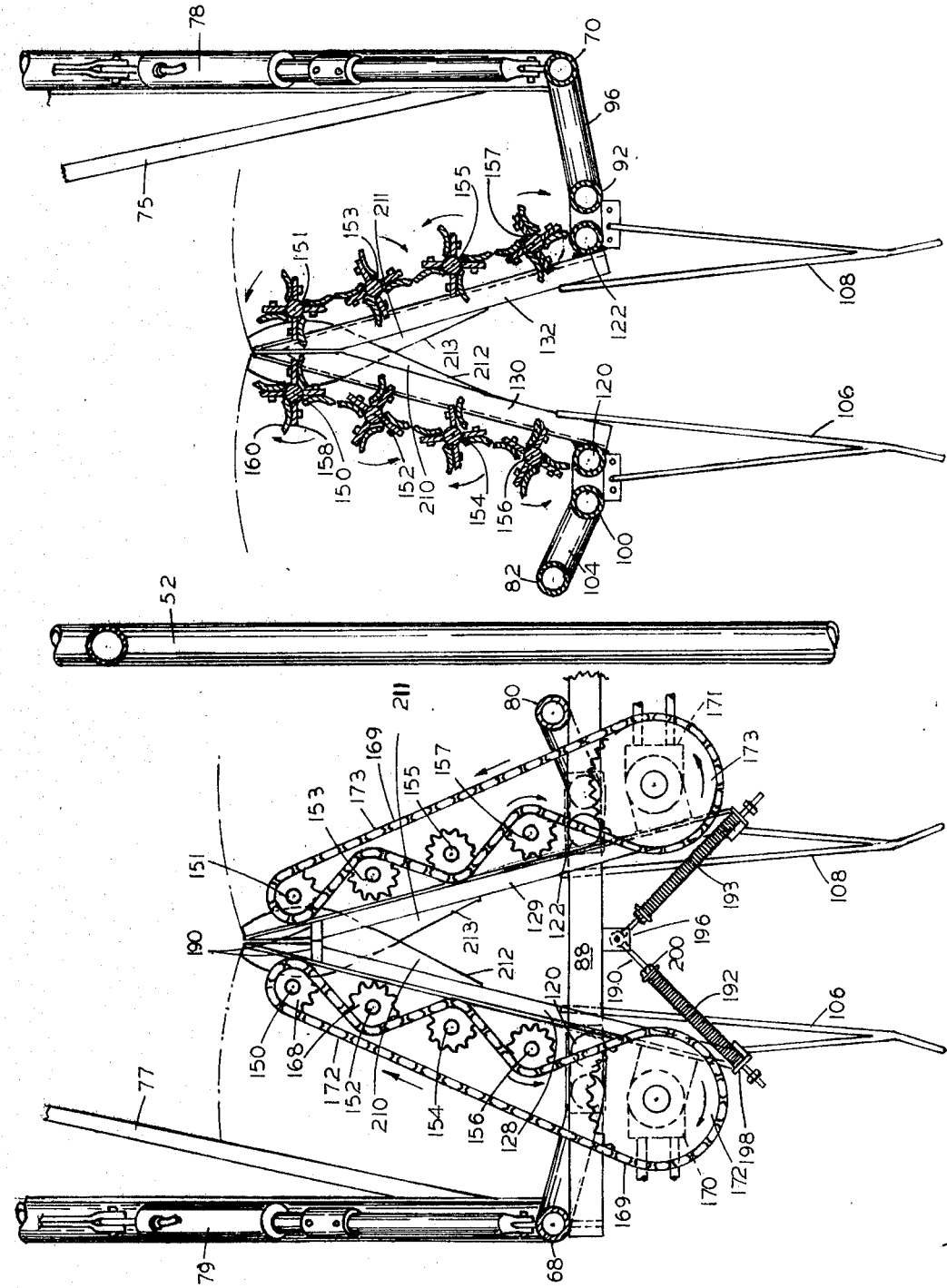
Figure 5:
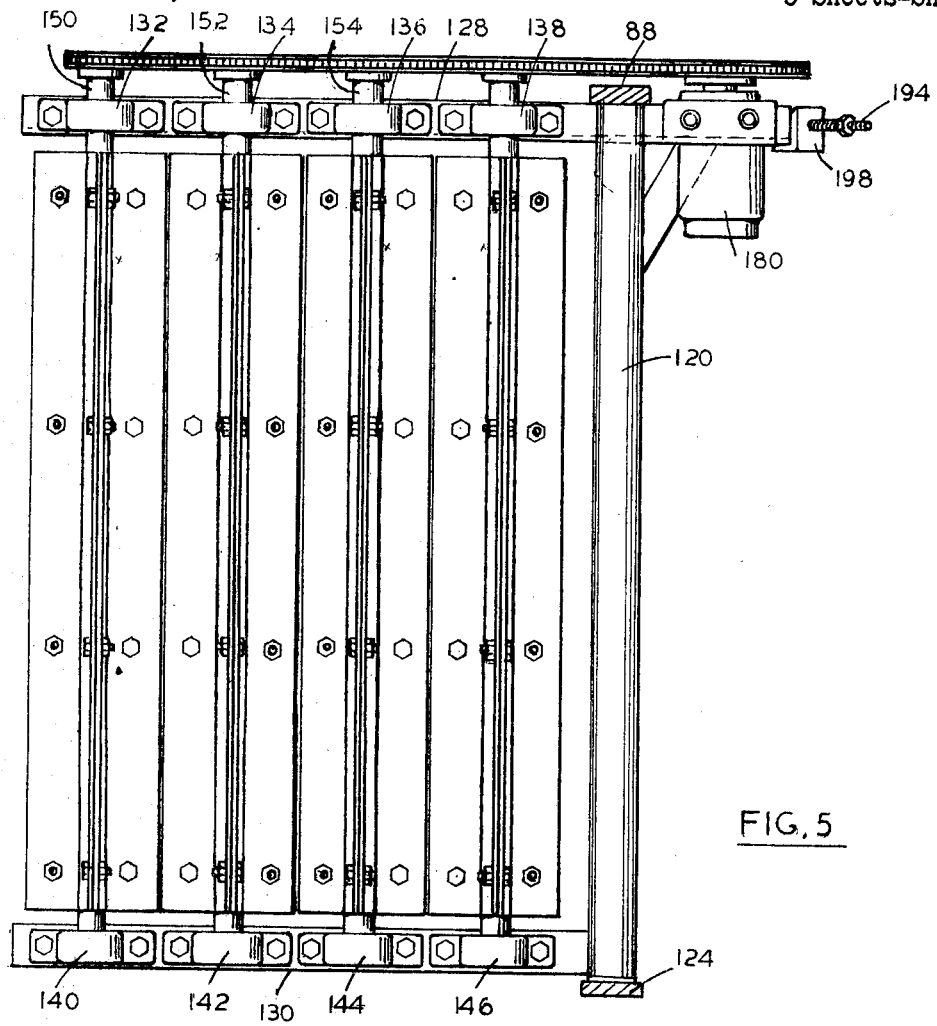
Figure 6:
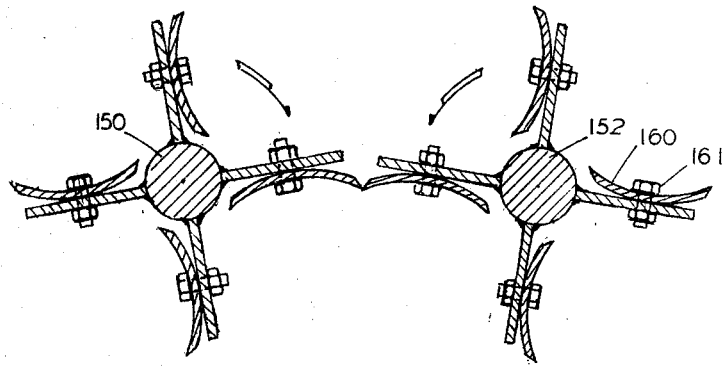
Figure 7:
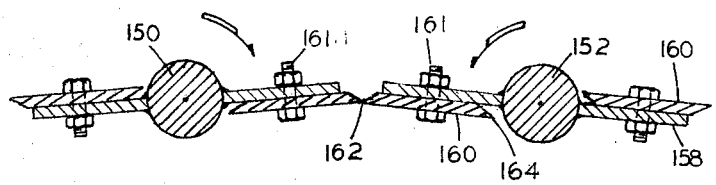

FIG. 1 is a side elevation of the deleafer;
FIG. 2 is a front elevational view taken from the line 2—2, drawbar, frame and power shaft being in section;
FIG. 3 is a rear elevational view;
FIG. 4 is a plan view of the deleafing apparatus, with the right hand half in section as viewed from the broken line 4—4 of FIG. 2;
FIG. 5 is a view of a rotary cutter assembly from the bearing side;
FIG. 6 is an enlarged end view of a pair of adjacent rotary cutters; and
FIG. 7 is an enlarged end view of a pair of modified cutters.

Referring to FIGS. 1 and 3, there is shown a frame supported from wheels 20 and 22 suitably spaced to clear two rows of brussels sprouts which grow to a height of 18–20 inches, and which may be set out in rows spaced 36 inches, in which case the wheel centers would be spaced about 72 inches. The frame comprises a rear transverse member 24 disposed high enough to clear the sprout stalks. Such member 24 has depending columns 26 and 28, at the lower ends of which are stub shafts 30 and 32. The member 24 is connected to a forward frame member 34 through upwardly inclined struts 36 and 38, and the forward frame member 34 is supported upon vertical side columns 40 and 42, which at their lower ends are connected to the stub shafts 30 and 32 by L members such as 44 each of which extends forwardly from one of the stub shafts 30 or 32, and laterally to one or the other of the columns 40 or 42. A center fore and aft frame member or center sill 46 extends from the lower end of a rear central vertical column 48, depending from the transverse member 24. A drawbar 50, disposed immediately above the member 46, also extends from the depending column 48 at the rear, and extends forwardly of the apparatus for coupling to and support from a tractor.

Above the drawbar, is a tubular housing 52, in which is journalled a power shaft 53 driven through a universal joint 58, from the power take-off of the tractor. At the rear, the shaft is provided with sprockets 61 and 60 for driving oil pumps 62 and 64.

Forwardly of the frame member 34, and columns 40 and 42 is a second floating frame assembly 66 having vertical side members 68 and 70 connected by two parallelogram linkages each including pivotal links 72 and 74, extending to the columns 40 and 42 respectively. Counter balance springs 76 are provided on opposite sides, and diagonal power cylinder links 78 and 79 are provided on opposite sides. By applying oil pressure to the cylinders 78 and 79, one side or the other or both, of the frame 66 may be lifted, or adjusted and held to a desired height relative to the rear wheel supported frame, by reason of the flexible mounting of the frame 66, through the parallelogram linkages on opposite sides, which linkages extend forwardly from the rear frame columns 40 and 42. The lower links 74, may have inclined brace links 75 or 77 extending to and pivoted on the L members 44, to prevent lateral sway.

The floating frame assembly 66 comprises the outer columns 68 and 70, and central columns 80 and 82, depending from the cross member 83. The columns 70 and 82, and 68 and 80 are provided with transverse tie members 84 and 86. A transverse bar 88 extends across the front of the frame 66, and outer pivot bracket members 90 and 92 depend therefrom and are braced at their lower ends, as at 94 and 96, to the columns 68 and 70. Inner pivot brackets 98 and 100 also depend from the bar 88, and are braced to the columns 80 and 82 as at 102 and 104. There are thus provided a pair of inverted U frames, or arches, through which the upstanding sprout stalks of two adjacent rows may pass as the apparatus moves down the field. Extending forwardly of each arch are leaf elevators 106 and 108, in the form of inclined guide rods 110 and 112 supported by rods 114 and 116 respectively, extending forwardly from the braces 94 and 102, and 98 and 104. The forward ends of the rods 110 and 112 skirt the ground, and lift the leaves so as to cause the leaves to extend laterally from the stalk at a suitable elevation for the effective close shearing from the stalk, as will appear hereinafter. One or more additional leaf elevators located above those shown may also be provided, in which case the support rods would extend forwardly from the members 90, 98, 100 and 92.

Associated with each inverted U frame are a pair of right and left hand rotary cutter or knife assemblies pivoted on vertical axes, the left hand pair, see FIGS. 2 or 4 being supported on pivot brackets 90, 98, and the other being pivotally supported on brackets 92 and 100. Each knife assembly of a pair comprises a tubular column as at 120 or 122, pivoted at its lower end upon bracket feet 124 or 126 respectively and at its upper end to the underside of the bar 88. Welded to each of the columns 120 or 122 are heavy upper and lower parallel angle irons 128 and 130 or 129 and 131. The upper angle irons 128 and 129 extend forward of their respective columns 120 and 122.

Each of the angle irons 128 and 130 are provided on their rear faces with four uniformly spaced bearings 132, 134, 136 and 138 and 140, 142, 144 and 146, respectively, the corresponding upper and lower bearings being in alignment.

Journalled in each of the upper and corresponding lower bearing is a shaft, each shaft having two, three or four lengthwise extending knife blades, the blades being about 28 inches long, and having cuting edges fixed on or adjustable to a radius of approximately 2½ inches.

The shafts 150 and 152 and the shafts 154 and 156 are spaced five inches and each shaft has two, three or four blade supporting wings 158 uniformly spaced around the shaft, and welded thereto. To each blade supporting wing, are bolted hardened steel cutter blades 160 as at 161, each blade preferably having two cutting edges 162 and 164, one of which is held in reserve, and each being symmetrical. Using a shaft diameter of one inch, the blades may be 1⅞" wide and the rear faces 166 of the cutting edges may be ground to about 37 degrees. The wings may be about 1¾" wide. Each of the shafts are provided at the upper end with a like sprocket 168 having an odd number of teeth, and a single drive chain 169 interlaces or weaves over the successive sprockets 168 in the manner shown in FIG. 4 to provide opposite rotation between the shafts 150 and 152, and the shafts 154 and 156. The sprockets 168 on shafts 150, 152, 154 and 156 are driven by a hydraulic motor 170 mounted on the forward end of the angle iron 128, such motor being provided with a large drive sprocket 172 for the purpose.

The left hand sprocket 172 is driven clockwise as shown in FIG. 4, and the right hand sprocket 173, driven by motor 171, rotates counterclockwise. Thus shafts 150 and 154 rotate clockwise (as seen in FIG. 4) and shafts 152 and 156 rotate counterclockwise. The shafts 151 and 155, driven by chain 173 and sprocket 171 rotate counterclockwise, and shafts 153 and 157 rotate clockwise.

The hydraulic motors 170 and 171 which drive the sprockets 172 and 173 are matched as to speed and are connected in series by a conduit 182, so that their speeds, although in reverse directions, will be the same. Each motor 170 or 171 is mounted on the forward extension of the angle irons 128 or 129 respectively, and swings with its cutter assembly about the axis of the pivot tube 120 or 122. By employing sprockets 168 all alike and with an odd number teeth, relative angular adjustments between adjacent shafts 150 and 152, and 154 and 156 may be reduced to half of the pitch of the links of the chain, and by this means, the cutting edges 162 of the knives carried on the shafts 150 and 152, can be caused to come together, practically into contact, so as to shear the stems of any leaves drawn through the space between the shafts 150 and 152 or the shafts 154 and 156, before a pair of knives close. In practice such shafts may be driven at speeds up to 2500 r.p.m. By employing two blades per shaft as in FIG. 7, there is more space for the large leaves to be drawn in between the shafts when the knives are 90 degrees from the positions shown in FIG. 7, there being less space in the four blade form when the blades are 45 degrees from the positions shown in FIGS. 4 or 6. Since the knives on shafts 150 and 152, and on shafts 154 and 156 tend to sweep or pull the leaves laterally to the left of the plant before cutting, while the knives on shafts 151 and 153 and 155 and 157 tend to sweep or pull leaves caught therebetween laterally to the right, it is desirable that the rotation speeds of the shaft 150 and shaft 151 be the same so that any lateral pull upon the leaves on one side of the plant may be counteracted by a similar opposite pull.

It can be seen in FIG. 4 that the lower frame members 128 and 129 have bumpers or stops 190, which limit the approach of the frame assemblies toward one another. In order to urge the frame members 128 and 130 to swing about the axis of the pivot post 120 in a clockwise direction to the position shown, a compression spring 192, disposed on guide rod 194, pivoted on a bracket 196 on the bar 88, and slidable in an aperture in an angle bracket 198 affixed to the end of angle iron 128 is provided. The degree of compression is nicely adjusted by the nut 200. A similar compression spring 193 is provided to urge the frame including angle irons 129 and 131 to swing counterclockwise.

It will be understood that as a sprouts stalk enters between two knife frame assemblies, the leaves are elevated by the bars 106 and 108. With the swinging knife assemblies in the position shown in FIG. 4, the spacing between the knives on shafts 154 and 156, and 155 and 157 is wide enough to avoid contact with the sprouts on the stalks. However, the laterally and rearwardly extending leaves are drawn into the pairs of counterrotating knives on shafts 154 and 156, and 155 and 157, and the stems cut, and the leaves thrown into the valleys between the rows.

As the deleafer moves further, and the sprout stalks move more deeply into the throat of the swinging knife assemblies, it is necessary to automatically spread the assemblies so that the revolving knives of shafts 150 and 152, and shafts 151 and 153 will be kept clear of the sprouts. For this purpose the frame angle irons 130 and 131 are each provided with cams 210 and 211 respectively, which as shown in FIG. 4 overlap one another. The cams 210 and 211 have stalk engaging edges 212 and 213 at approximately ground level whereby to engage the stalks below the sprouts. Thus as the deleafer proceeds along the row, the knife assemblies are cammed away from the sprout stalk by the stalk stem at approximately ground level.

The cams 210 and 211 are so contoured as to cause each of the swinging knife assemblies to move away from each sprout stalk just before the circular sweep of the blades on shafts 150 and 152, and the circular sweep of the blades on shafts 151 and 153 would embrace and injure the sprouts clustered on a stalk. Leaves extending rearwardly of the stalks may be pushed forward by the blades of the shafts 150 and 151 and then swept laterally to be cut by the interaction of the knife blades on shafts 150 and 152, or shafts 151 and 153. The length of the cams will be such as to keep the circular sweep of the blades of the shafts 150 and 151 spaced from the sprouts until the apparatus has passed beyond the particular sprout stalk. As the trailing end of the cams 210 and 211 pass beyond the stalk stem, the springs 192 and 193 urge the knife assemblies to swing closed, and the combined effect of the knifes on the shafts 150 and 151 may cooperate to cut off leaves extending forwardly of the plant, while the knives on shafts 150 and 152, and on shafts 151 and 153 clip the laterally extending leaves drawn into the knives. Hence it can be seen that the apparatus not only cuts the leaves extending rearwardly, and forwardly of each plant as well as those extending laterally.

In practice, the stop 190 may act to allow the swinging assemblies to move just close enough so that the distance between shafts 150 and 151 is 5 inches, so that the cutting edges of the blades on shafts 150 and 151 cannot contact, but are so close as to permit the knives of each shaft to cooperate in the shearing of leaves from the plant, in about the same manner as the knives on adjacent shafts such as 150 and 152.

To provide adequate power to drive the knife assemblies, two pumps 62 and 64 in parallel may be employed, both drawing from the reservoir 65 as by pipes 290 and 292 respectively. The motors 170 and 171 of the left hand deleafer, are connected in series as at 182, and in turn in series with the motors 170 and 171 of the right hand pair which are in series as at 183, so that all motors rotate at the same speed. A by-pass valve 300, manually adjusted, to allow a part or all of the pumped oil to return to the reservoir as at 291, serves as a speed control for the apparatus. Oil not bypassed flows through conduit 302 to the motors in series, and returns from the motors to the reservoir through conduit 304.

The cams 210 and 211 are so contoured as to cause each of the swinging knife assemblies to move away from each sprout stalk just before the sweep of the blades on shafts 150 and 152, and the sweep of the blade shafts 151 and 153, might embrace and injure the sprouts clustered on a stalk. In this manner, leaves extending rearwardly of the stalks may be pushed forward by the blades of the shafts 150 and 151, and then swept laterally to be cut by the interaction of the knife blades on shafts 151 and 153. The length of the cams will be such as to keep the sweep of the blades of the shafts 150 and 151 spaced from the sprouts until the apparatus has passed beyond the particular sprout. As the trailing end of the cams 210 and 211 pass beyond the stalk stem, the springs 192 and 193 urge the knife assemblies to swing closed, which permits the opposed knives to close in and cut the forwardly extending leaves, as the deleafer leaves each plant.

The forward arch 66 is shown, in FIG. 1, in a generally vertical position. Since the sprout plants are grown in hills, and the stalk emerges from the ground out of the hills, it is generally found desirable to adjust the length of the arms 72 so as to be about 1½ to 2 inches longer than the arms 74, through the adjustment clamps at 73, and thereby cause the upper end of frame 66 to tilt forward, along with the shafts of the swinging knife assemblies. At the same time the cams 210 and 211 are lifted by the tilting of the arch, so as to engage the stalks just above where they emerge from the ground. The cam plates are sufficiently thin to ride between the lowest sprouts without injury, or upon the stalk just below, and the height of the cam above the ground should be such as to avoid riding on the hills out of which the stalks grow. The combined effect of the apparatus, when drawn by a tractor at speeds up to five miles an hour, is to deleaf one or more acres per hour, a tedious task formerly accomplished by manual labor, on foot.

Whether arcuate knives, as shown in FIG. 4 or 6, or flat knives, either in pairs, or three or four per shaft are employed, effective results are obtained, and by providing two cutting edges, a fresh blade edge can quickly be provided, in the field if necessary, for when the crop is ready for harvest, any delays can be costly.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A deleafer for brussels sprouts and like leafy plants disposed in rows comprising a mobile frame comprising transverse members disposed at a height to clear two rows of the plants, said frame having depending outside members and central members, a pair of laterally spaced wheels disposed at the rear of the frame and journalled on stub shafts affixed to the outside members, a tractor draw bar extending forwardly from said depending central members, said frame including an outside vertical column disposed forwardly of each wheel, a floating frame comprising transverse members at a height to clear the plants, and depending central and outside columns providing a pair of inverted U frames spaced to clear two rows of plants, parallelogram linkages connecting the outside columns of said floating frame and outside columns of the mobile frame and power actuated diagonals for each linkage for varying the height of the floating frame in regard to the wheel frame, a pair of vertical cutter frame brackets carried by said floating frame for each row of plants, a cutter frame pivoted on each of said brackets on opposite sides of a row, said cutter frames extending rearwardly of said brackets and each having a pair of oppositely rotating vertical shafts having leaf stem cutting knives, power means for rotating the vertical shafts of all the cutter frames, means for urging the trailing ends of each pair of said cutter frames toward one another to bring the cutters of the opposite cutter frames of each pair in cooperative relation to cut fore and aft extending plant leaves, and cam means disposed at ground level to said frames adapted to engage the root stem of each plant, to move the trailing ends of the cutter frames laterally away from each plant a sufficient distance to restrict the rotary knives to the cutting of leaves projecting from the plants, and means projecting forward of the brackets of said floating frame and inclined downwardly toward ground level and adapted to engage transversely extending leaves and lift the same for effective cutting by the cutter of said cutter frames.

2. A deleafer as set forth in claim 1 wherein each of the cutter frames comprises two pairs of parallel vertical shafts uniformly spaced and having like radial extending knives with paraxial cutting edge, and power means carried by the cutter frames, and adapted to drive the shafts of each pair in opposite directions and at the same speed, with the knives of each pair cooperatively moving in a direction away from the row.

3. A deleafer as set forth in claim 2 wherein each of the power means of the cutter frames is driven at approximately the same speed.

4. A deleafer as set forth in claim 3 wherein each of the power means comprises like hydraulic motors connected in series.

5. A deleafer in accordance with claim 4 wherein the hydraulic power means is driven by a mobile frame carried pump having drive means adapted to be connected to a tractor power take off.

6. A deleafer for brussels sprouts and like leafy plants comprising a mobile inverted U frame adapted to move along and clear a row of plants, rotary substantially vertical axis leaf cutting means mounted on opposite sides of the frame on arms adapted to swing laterally, and means associated with the cutting means disposed substantially at ground level for cam like engagement of the plant stem close to the ground to control the spacing of the rotary cutter in relation to the plant and restrict the cutting to the leaves thereof.

7. A deleafer according to claim 6 having spaced means projecting forward and inclined downward of the frame toward the ground to lift laterally extending leaves of the plants of a row away from the ground disposed ahead of the cutting means.

8. A deleafer for brussels sprouts and like leafy plants comprising a mobile inverted U frame adapted to move along and clear a row of plants, spaced means projecting forward and inclined downward of the frame toward the ground to lift laterally extending leaves of the plants of a row away from the ground, and means mounted for lateral movement on opposite sides of the frame for cutting the leaves from the plants, said cutting means comprising like vertical axis rotary knife blade cutters arranged in pairs rotating in opposite directions at like speeds, with the adjacent cooperating blades of each pair moving away from the plant row.

9. A deleafer according to claim 8 having means associated with the cutting means disposed substantially at ground level for cam like engagement of the plant stem close to the ground to control the spacing of the rotary cutting means in relation to the plant and restrict the cutting to the leaves thereof.

10. A deleafer for brussels sprouts and like leafy plants comprising a mobile inverted U frame adapted to move along and clear a row of plants, spaced means projecting forward and inclined downward of the frame toward the ground to lift laterally extending leaves of the plants of a row away from the ground, and means mounted on opposite sides of the frame for cutting the leaves from the plants, said cutting means comprising like vertical axis rotary knife blade cutters arranged in pairs rotating in opposite directions at like speeds, with the adjacent co-operating blades of each pair moving away from the plant row.

References Cited
UNITED STATES PATENTS

| | | | |
|---|---|---|---|
| 625,688 | 5/1899 | Kepner | 56—234 |
| 1,869,394 | 8/1932 | Sikma | 56—235 |
| 2,458,299 | 1/1949 | Powers | 56—17 |
| 3,093,949 | 6/1963 | Splinter | 56—27.5 |

F. BARRY SHAY, Primary Examiner

J. A. OLIFF, Assistant Examiner

U.S. Cl. X.R.

56—327